United States Patent Office 2,823,160
Patented Feb. 11, 1958

2,823,160

SUBSTITUTED PYRIMIDINES COMPOSITIONS FOR CHEMOTHERAPY OF COCCIDIOSIS

Russell E. Lux, Myerstown, and Ammon M. Brubaker, Sheridan, Pa., assignors to Whitmoyer Laboratories, Inc., Myerstown, Pa., a corporation of Delaware No Drawing. Application March 29, 1955
Serial No. 497,816

15 Claims. (Cl. 167—53.1)

This invention relates generally to the art of veterinary medicine and more particularly to the chemotherapy of the disease in poultry known as coccidiosis.

Coccidiosis in poultry ranks in the forefront with those diseases which are most destructive and causes very large economic losses. Coccidiosis is a protozoan infection commonly occurring between the ages of two to fourteen weeks in poultry. The disease organisms multiply in the digestive tract, particularly in the intestine. Disease symptoms are characterized by bowel disorders, hemorrhage, anemia and general unthriftiness. Mortality is generally substantial, varying with the severity of the infection.

Two common types of coccidiosis are known: the "cecal," caused by the coccidium *Eimeria tenella*, and characterized by a severe hemorrhage on or about the fifth day after infection; and the "intestinal," caused by at least seven types of Eimeria; namely, *E. acervulina, E. nectatrix, C. maxima, E. hagani, E. mitis, E. praecox,* and *E. brunetti*. The intestinal type is generally referred to as the "chronic" and the cecal as the "acute."

Various therapeutic preparations have been used to lessen the severity of the losses associated with the disease. Our general experience has been that most, if not all, of those preparations now commercially available have one or more of the following drawbacks or failings. Their effectiveness in suppressing or treating the disease is not high; quite often the high use levels required impose an undue economic burden on the poultry raiser; the drugs may function only as a prophylactic and not as a control for an established infection; their use may be attended by certain undesirable side effects, namely, toxicity, as evidenced by lowered weight gains and feed consumption.

It is an object of this invention to provide an effective therapeutic control of coccidiosis in poultry. This invention provides compositions for combatting this disease which may be fed to poultry in very small yet effective dosage without discernible unwanted side effects. The very low use levels make their use extremely economical. Furthermore, mortality due to severe infections may be reduced to nil or, at least, a minimum.

It will be understood by those skilled in the art that "ingestive vehicle" as used herein means a comestible which may be partaken by the poultry and includes feed or drink such as, grain, mash, scratch, or pulverulent comestible, and water, or other comestible liquid. "Use level" as used herein will be understood to mean the amount or concentration of the drug or active compound carried in the ingestive vehicle.

We have discovered that certain 2,4 diamino-5-benzyl pyrimidines are effective to control infection of coccidiosis when administered to poultry in very low concentration. The 2,4 diamino-5-benzyl pyrimidines which we have found to be particularly effective are those of the general formula:

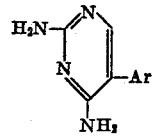

in which Ar is an appropriately substituted benzyl group; effective substituted benzyl groups include 3-ethoxy, 4-methoxy and similar di-ether groups where the alkyl portion of the ether is a lower alkyl group, such as 3,4-dimethoxy and 3-methoxy-4-ethoxy.

Among the preferred compounds which we have found to be active as coccidiostats belong to the classes described chemically as 2,4-diamino-5-(dialkoxybenzyl)-pyrimidines. More desirably the 5-(dialkoxybenzyl) substituted 2,4-diamino-pyrimidines are the 2,4-diamino-5-(3', 4'-di-lower alkoxybenzyl) pyrimidines.

We have found that these pyrimidine compounds may be effectively administered to a flock of poultry by incorporating it in an ingestive vehicle and the concentrations in the vehicle may be as high as 0.05% without undue toxic effect. Also, these compounds may be administered in the ingestive vehicle in a concentration as low as 0.001% and still be effective as a prophylactic; that is, as a suppressive to prevent the occurrence of the disease in an otherwise healthy flock which might be subjected to the disease organisms. We have found that when these compounds are fed to poultry in feed mash, use levels of .001% to .015%, administered as a prophylactic, and .015% to .05%, administered as a treatment, are effective. These percentages are considerably lower than those permissible with most medications for combatting coccidiosis which have heretofore been commercially available.

We have also found that the 2,4-diamino-5-(3',4'-di-lower alkoxybenzyl) pyrimidines mentioned above are effective synergists for certain sulfonamides so that the therapeutic activity of the sulfonamides may be effectively enhanced when the diamino-pyrimidine is administered together with the sulfonamide and an effective dosage may be considerably less than the dosage required if only one of these compounds were administered.

The use of certain sulfonamides for treating coccidiosis has been practiced for more than a decade. Sulfaquinoxaline is the most successful known to us and perhaps the most widely used sulfonamide available for treatment of coccidiosis. However, use levels recommended when this drug is administered as a coccidiostat are .015% as a prophylactic and .05% as a treatment of an established infection when the drug is fed in an ingestive vehicle, such as mash feed. Notwithstanding the effectiveness of sulfaquinoxaline as a coccidiostat with the optimum or permissible use level, we have found that its activity may be enhanced by use with the sulfaquinoxaline, or other sulfa drug of this type, of the 2,4 diamino-5-benzyl-pyrimidines such as those mentioned herein as having the desirable synergistic activity and, as a consequence, a preparation may be produced which is effective in lower concentration in the ingestive vehicle than if the sulfonamide drug were used alone as a coccidiostat in the ingestive vehicle.

To establish the effectiveness of 2,4-diamino-5-(3',4'-di-lower benzyl) pyrimidines both alone and with certain readily available sulfonamides such as sulfaquinoxaline, sulfamethazine and sulfadiazine, we have conducted a large number of tests. These tests included the pyrimidines alone and with the sulfonamides in varying relative amounts and concentrations or use levels in mash fed to poultry and in the drinking water supplied to the poultry. These tests, frequently referred to by workers in this art as "screening" tests, are designed to determine activity and effectiveness of the compounds being tested. In conducting screening tests to determine the activity of the various diamino pyrimidines mentioned herein and combinations of the diamino-pyrimidines together with the sulfa drugs, the following described procedure was used: A large number of chicks, three to four weeks old, divided into groups of at least ten each, are infected by administering to them orally equal amounts of coccidiosis cocysts, such as E. tenella. This infection will result in a certain percentage of mortality in five to eight days, if the chicks do not receive a drug which is therapeutically active in suppressing the infection. Each group of infected chicks is given a compound being tested and in each test is included a group of the same flock of infected chicks which are not given any medication (this group being designated as an "unmedicated control"), and also included is a group of infected chicks to which is administered a drug heretofore known to be one active to suppress coccidiosis (this group being designated as a "medicated control"). The other groups from the same infected flock are given the compound being tested, the different groups receiving varying but controlled amounts of the compound. In this way, results with a group of chicks receiving the compound being tested may be compared with both of the control groups.

An infection of E. tenella will also produce a certain amount of damage or lesions to the cecal walls. These are evaluated in the tests on each chick that dies during the course of the test. After eight days several survivors from each group are sacrificed for autopsy and the cecal lesions evaluated. Accordingly, in addition to comparing mortality rates in the groups, a comparison of cecal lesions of the test compound group with the control groups serves as a basis for determining therapeutic activity.

In some instances in the tests, the test compound was administered before the chicks were infected; in others it was administered after infection; and in others, at the time the chicks were infected. For example, in the tables which appear hereinafter and which show the conditions and results of a number of representative tests, it will be noted in the column labeled "Conditions," a plus (+) sign before the number indicates that the drug administration was started before infection and the number indicates the hours. Thus "+24" indicates that administration of the drug was started twenty-four hours before infection. A minus (—) sign indicates drug administration was started after infection. Thus, "—48" indicates administration of the drug was started forty-eight hours after infection. Zero (0) indicates the drug administration was started at the time of infection. This variation in time of drug admnistration serves to determine whether the compound is therapeutically active in suppressing infection which is already established or only in preventing the occurrence or spread of cecal coccidiosis in a flock.

The compounds being tested were administered by including them intermixed in mash feed set before the chicks to be partaken ad libitum, and in some tests, in the drinking water, in amounts or concentrations as indicated in the tables, the percentages being by weight.

The results of illustrative tests are set forth in the tables which follow. These data will serve to show the activity of the compounds listed in combatting or suppressing coccidiosis at different use levels.

In Tables I and II the column "Test No." indicates the identifying number of the test; "Group Ref. No." indicates an identifying number for the group of chicks. The compound used is indicated by the Roman numeral in the "Drug" column, according to the following "Index to Tables." The column "Use level, percent" shows the percent of drug intermixed with the ingestive vehicle, which in each case in the tables was feed mash. The column labeled "Conditions" is explained above. The column "Mortality, percent" indicates the percentage of chicks in a group which died during the eight-day period of each test. The column "Cecal lesions" indicates the severity of lesions on post mortem examination of the group. As a standard of comparison, four plus signs (++++) is taken as severe, and a single plus sign (+) is taken as slight. An unmedicated control group is designated UMC. and a medicated control group is designated MC.

INDEX TO TABLES

I—2,4 diamino-5-(3',4' dimethoxybenzl)-pyrimidine
II—2,4 diamino-5-(3',4' dimethoxybenzyl)-pyrimidine hydrochloride
III—2,4 diamino-5-(3' ethoxy, 4' methoxybenzyl)-pyrimidine
IV—2,4 diamino-5-(4' ethoxy, 3' methoxybenzyl)-pyrimidine
V—2,4 diamino-5-(3' methoxy, 4' propoxybenzyl)-pyrimidine
VI—2,4 diamino-5-(4' methoxy, 3' propoxybenzyl)-pyrimidine
VII—2,4 diamino-5-(p-chlorophenyl)-6-ethyl pyrimidine
VIII—Sulfaquinoxaline
IX—Sulfamethazine
X—Sulfadiazine
XI—Nitrofurazone
XII—Whitsyn 3—(Supplies .01% VIII and .003% VII when .25% by weight is added to mash ration)
XIII—Whitsyn 5—(Supplies .01% VIII and .005% VII when .25% by weight is added to mash ration)

*Table I*

| Test No. | Group Ref. No. | Drug | Use Level, Percent | Conditions | Mortality, Percent | Cecal Lesions |
|---|---|---|---|---|---|---|
| 79V | 1 UMC | | | +24 | 50 | +++ |
| 79V | 2 MC | VIII | .05 | +24 | 0 | +++ |
| 79V | 3 | I | .005 | +24 | 0 | ++ |
| 79V | 4 | I | .01 | +24 | 0 | ++ |
| 79V | 5 | I | .02 | +24 | 0 | + |
| 84V | 10 UMC | | | −24 | 30 | ++++ |
| 84V | 11 MC | VIII | .1 | −24 | 0 | +++ |
| 84V | 12 | I | .01 | −24 | 0 | + |
| 84V | 13 | I | .02 | −24 | 0 | 0 |
| 95V | 20 UMC | | | 0 | 50 | +++ |
| 95V | 21 MC | VIII | .05 | 0 | 0 | ++ |
| 95V | 22 | I | .005 | 0 | 0 | ++ |
| 95V | 23 | I | .01 | 0 | 0 | + |
| 95V | 24 | I | .02 | 0 | 0 | 0 |
| 100V | 30 UMC | | | −24 | 60 | +++ |
| 100V | 31 MC | VIII | .05 | −24 | 0 | +++ |
| 100V | 32 | II | .0085 | −24 | 0 | + |
| 100V | 33 | II | .017 | −24 | 0 | + |
| 95V | 40 UMC | | | 0 | 50 | +++ |
| 95V | 41 MC | VIII | .05 | 0 | 0 | ++ |
| 95V | 42 | II | .005 | 0 | 0 | + |
| 95V | 43 | II | .01 | 0 | 12 | + |
| 95V | 44 | II | .02 | 0 | 0 | + |
| 100V | 50 UMC | | | −24 | 60 | +++ |
| 100V | 51 MC | VIII | .05 | −24 | 0 | +++ |
| 100V | 52 | II | .0075 | −24 | 20 | ++ |
| 100V | 53 | II | .015 | −24 | 0 | + |
| 52V | 60 UMC | | | +48 | 50 | +++ |
| 52V | 61 MC | XI | .02 | +48 | 0 | + |
| 52V | 62 | III | .02 | +48 | 0 | + |
| 52V | 63 | III | .05 | +48 | 0 | 0 |
| 94V | 70 UMC | | | 0 | 63 | +++ |
| 94V | 71 MC | VIII | .05 | 0 | 0 | + |
| 94V | 72 | IV | .01 | 0 | 0 | +++ |
| 94V | 73 | IV | .02 | 0 | 0 | + |
| 98V | 80 UMC | | | 0 | 30 | +++ |
| 98V | 81 MC | XII | .25 | 0 | 0 | + |
| 98V | 82 | V | .05 | 0 | 0 | ++ |
| 99V | 90 UMC | | | 0 | 50 | ++++ |
| 99V | 91 | I | .01 | 0 | 0 | ++ |
| 99V | 92 | I | .02 | 0 | 0 | + |
| 100V | 100 UMC | | | −24 | 60 | +++ |
| 100V | 101 MC | VIII | .05 | −24 | 0 | +++ |
| 100V | 102 | VI | .01 | −24 | 10 | + |
| 100V | 103 | VI | .02 | −24 | 0 | 0 |
| 100V | 104 | VI | .05 | −24 | 0 | 0 |

Table II

| Test No. | Group Ref. No. | Drug Use Level | | Conditions | Mortality | Cecal Lesions |
|---|---|---|---|---|---|---|
| | | Synergist, Percent | Sulfonamide, Percent | | | |
| 79 | 110 UMC | | | +24 | 50 | +++ |
| 79 | 111 | | .05 VIII | +24 | 0 | +++ |
| 79 | 112 | .0025 I | .005 VIII | +24 | 0 | +++ |
| 79 | 113 | .00375 I | .005 VIII | +24 | 0 | ++ |
| 90 | 120 UMC | | | +24 | 40 | +++ |
| 90 | 121 | .005 VII | .01 VIII | +24 | 0 | 0 |
| 90 | 122 | .0025 I | .01 VIII | +24 | 0 | + |
| 90 | 123 | .005 I | .01 VIII | +24 | 0 | 0 |
| 79 | 130 UMC | | | −48 | 50 | +++ |
| 79 | 131 | .005 VII | .01 VIII | −48 | 0 | ++ |
| 79 | 132 | .005 I | .01 VIII | −48 | 0 | ++ |
| 101 | 140 UMC | | | +24 | 50 | +++ |
| 101 | 141 | | .25 IX | +24 | 0 | ++ |
| 101 | 142 | .0025 I | .018 X | +24 | 0 | ++ |
| 104 | 150 | | .018 X | +24 | 83 | +++ |
| 104 | 151 | | .075 X | +24 | 62 | +++ |
| 104 | 152 | .004 I | .0375 X | +24 | 0 | + |
| 104 | 153 | .002 I | .0375 X | +24 | 0 | + |

The results disclosed by the data tabulated in the tables show that the various 2,4 diamino-5-(dialkoxybenzyl) pyrimidines are effective in combatting coccidiosis when used at very low use levels and that these pyrimidine compounds when used together with the sulfonamides enhance the effectiveness of the latter and permit a lower use level than would be the case if only one of the drugs were used.

In preparing the therapeutic ration, that is, the feed or drink, which is set before the poultry to be partaken ad libitum we prefer to make up a "pre-mix." That is, predetermined quantities of the selected diamino-pyrimidine compound and the selected sulfonamide are intermixed with a quantity of a diluent such as an inactive or inert pulverulent solid, for example, bentonite or soybean meal. Or the pre-mix may consist of the mixture of drugs in a suitable liquid carrier. Then this pre-mix, containing a known concentration of the mixture of the active drugs and their relative quantities, may be conveniently intermixed with the feed mash or drink set before the poultry. This procedure provides a convenient way to obtain a uniform distribution in the feed of the relatively small amount of the drugs required for effective dosage. For example, a pre-mix consisting of .1 lb. of 2,4 diamino-5-(3′, 4′ dimethoxybenzyl)-pyrimidine and .2 lb. of sulfaquinoxaline intermixed with 4.7 lbs. of bentonite (inert diluent) will, when the five-pound batch of pre-mix is intermixed with a ton of feed, provide a feed ration containing .005% of the diamino-pyrimidine drug and .01% of the sulfa drug. It will be manifest that in this way it will be easy to adjust and control the concentration of use level of the active ingredients in the ingestive vehicle (such as feed mash) for oral administration to a flock of poultry. The relative amounts of the mixture of the diamino-pyrimidine drug and the sulfa drug in the pre-mix may vary as well as the amount of the diluent which carries the mixture. The relative amount of the sulfa drug to the diamino-pyrimidine in the pre-mix may, for convenience in marketing, range from a very small amount, say .25 part, to 20 parts of the sulfa drug to 1 part of the diamino-pyrimidine drug. Or, for marketing purposes, if desired, a liquid pre-mix may be provided which carries the active ingredients in predetermined relative amounts so that the active drugs are carried in a suitable medium which may conveniently be intermixed with the drinking water for oral administration to the poultry.

It will be understood by those skilled in the art that it is the base that is the physiologically active part of the compounds mentioned herein. Consequently, the salts, such as the acid addition salts, and other similar modifications of the diamino-pyrimidine compounds referred to herein are regarded as equivalents of the corresponding diamino-pyrimidines. It will also be understood by those skilled in the art that the use levels of therapeutic agents of the nature herein disclosed will vary under different circumstances. It is common practice in many quarters to use low levels (low concentrations) of an active drug for feeding during the growing period (the first 8 to 12 weeks for chickens) to prevent or guard against the development of an infection in a flock during the growing period. Consequently, chicks which are exposed to a small amount of infection are rendered immune to cecal coccidiosis and sudden attacks and losses are avoided or minimized. Drugs used in this manner are spoken of as prophylactic. They are prophylactic to the degree that they limit the development of the infection. On the other hand, in those cases where the flock has become badly infected higher use levels may be necessary to combat and suppress the infection. The therapeutic agents provided by the invention lend themselves for use in either situation and are effective as prophylactic at low use levels; and at higher use levels without undue toxic effect for combatting and suppressing an established case of the disease.

The terms and expressions which have been employed herein are used as terms of description and not of limitation, and there is no intention in the use of such terms and expressions of excluding any equivalents of the features and compounds described and mentioned herein, but it is recognized that various modifications are possible within the spirit and scope of the invention claimed.

What is claimed is:

1. A ration for ad libitum feeding to a flock of poultry to combat the disease of coccidiosis in the poultry flock without intolerable toxic effect upon the poultry which comprises a feed vehicle in which is incorporated not less than .001 percent and not more than .05 percent by weight of a diamino-pyrimidine having the formula:

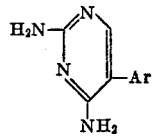

in which Ar is 3′,4′ dialkoxybenzyl.

2. A composition for combatting coccidiosis in poultry which may be fed to poultry as a feeding ration and consumed ad libitum which comprises a mixture of a non-toxic feed vehicle and a coccidiostat ingredient comprising a diamino-pyrimidine selected from the class consisting of 2,4-diamino-5-(3′,4′-dimethoxybenzyl)-pyrimidine
2,4-diamino-5-(3′ ethoxy-4′ methoxybenzyl)-pyrimidine
2,4-diamino-5-(4′ ethoxy-3′ methoxybenzyl)-pyrimidine
2,4-diamino-5-(4′ methoxy-3′ propoxybenzyl)-pyrimidine
2,4-diamino-5-(3′ methoxy-4′ propoxybenzyl) pyrimidine said mixture containing not less than .001 percent and not more than .05 percent by weight of said coccidiostat ingredient whereby the diamino-pyrimidine may be administered in effective dosage and at a use level which allows the poultry to feed ad libitum on the ration without intolerable toxic effect.

3. A chemotherapeutic composition for combatting coccidiosis in poultry which comprises a mixture of sulfonamide selected from the class consisting of sulfamethazine, sulfadiazine, sulfaquinoxaline, and a 2,4-diaminopyrimidine having the formula:

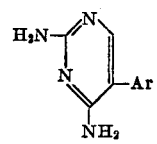

in which Ar is 3′,4′ dialkoxybenzyl.

4. A chemotherapeutic composition suitable for intermixing with an ingestive vehicle for oral administration to poultry for combatting the disease of coccidiosis in the poultry which comprises a mixture of 2,4 diamino-5-(substituted benzyl) pyrimidine in which the substituted benzyl is a 3',4' dialkoxybenzyl and a sulfonamide selected from the class consisting of sulfamenthazine, sulfadiazine and sulfaquinoxaline.

5. A chemotherapeutic feed ration for combatting coccidiosis in poultry and providing effective dosage when fed ad libitum to the poultry which comprises a feed mash in which is incorporated .001 to .02% by weight of a 2,4 diamino-5-(substituted benzyl) pyrimidine in which the substituted benzyl is 3',4' dialkoxybenzyl and .002 to 0.4% by weight of sulfanilamide selected from the class consisting of sulfamethazine, sulfadiazine and sulfaquinoxaline.

6. A chemotherapeutic composition for intermixing with an ingestive vehicle for oral administration to poultry for combatting the disease of coccidiosis in the poultry which comprises a synergistic mixture of 2,4-diamino-5-(3',4'-dimethoxybenzyl)-pyrimidine and sulfaquinoxaline.

7. A chemotherapeutic composition for intermixing with an ingestive vehicle for oral administration to poultry for combatting the disease of coccidiosis in the poultry which comprises a synergistic mixture of 2,4 diamino-5-(3' ethoxy, 4' methoxybenzyl)-pyrimidine and sulfaquinoxaline.

8. A chemotherapeutic composition for intermixing with an ingestive vehicle for oral administration to poultry for combatting the disease of coccidiosis in the poultry which comprises a synergistic mixture of 2,4 diamino-5-(3' methoxy, 4' propoxybenzyl)-pyrimidine and sulfaquinoxaline.

9. A chemotherapeutic composition suitable for intermixing with an ingestive vehicle for oral administration to poultry for combatting the disease of coccidiosis which comprises a synergistic mixture of 2,4 diamino pyrimidine having the formula

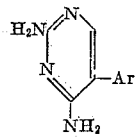

where Ar is 3',4' lower dialkoxybenzyl and sulfonamide selected from the class consisting of sulfamethazine, sulfadiazine and sulfaquinoxaline; said diamino pyrimidine and sulfonamide being present in the composition in a ratio of .025 to 20 parts sulfonamide to 1 part diamino pyrimidine.

10. A chemotherapeutic composition suitable for intermixing with an ingestive vehicle for oral admiinstration to poultry for combatting the disease of coccidiosis which comprises a combination of 2,4-diamino-5-(3',4'-dimethoxy)-pyrimidine and sulfaquinoxaline; said diamino pyrimidine and sulfaquinoxaline being present in said composition in the ratio of .25 to 20 parts of said sulfaquinoxaline to 1 part of said diamino pyrimidine.

11. A chemotherapeutic composition suitable for intermixing with an ingestive vehicle for oral administration to poultry for combatting the disease of coccidiosis which comprises a combination of sulfaquinoxaline and 2,4 diamino-5-(3' ethoxy, 4' methoxybenzyl)-pyrimidine; said diamino pyrimidine and sulfaquinoxaline being present in said composition in the ratio of .25 to 20 parts of said sulfaquinoxaline to 1 part of said diamino pyrimidine.

12. A chemotherapeutic composition suitable for intermixing with an ingestive vehicle for oral administration to poultry for combatting the disease of coccidiosis which comprises a combination of sulfaquinoxaline and 2,4 diamino-5-(3' methoxy, 4' propoxybenzyl)-pyrimidine; said diamino pyrimidine and sulfaquinoxaline being present in said composition in the ratio of 0.05 to 3 parts of said diamino pyrimidine to 1 part of said sulfaquinoxaline.

13. A chemotherapeutic composition for combatting coccidiosis in poultry which may be diluted with a nontoxic ingestive carrier for oral administration to the poultry by ad libitum feeding which comprises a mixture containing the combination of sulfaquinoxaline and 2,4 diamino-5-(3',4' dimethoxybenzyl) pyrimidine in the ratio of 1 to 20 parts by weight of sulfaquinoxaline to 1 part by weight of said diamino pyrimidine.

14. A chemotherapeutic composition for combatting coccidiosis in poultry which may be diluted with a nontoxic ingestive carrier for oral administration to the poultry by ad libitum feeding which comprises a mixture containing the combination of sulfaquinoxaline and 2,4 diamino-5-(3' ethoxy, 4' methoxybenzyl)-pyrimidine in the ratio of 1 to 20 parts by weight of sulfaquinoxaline to 1 part by weight of said diamino pyrimidine.

15. A chemotherapeutic composition for combatting coccidiosis in poultry which may be diluted with a nontoxic ingestive carrier for oral administration to the poultry by ad libitum feeding which comprises a synergistic mixture of 2,4 diamino-5-(3' methoxy, 4' propoxybenzyl)-pyrimidine in the ratio of 1 to 20 parts by weight of sulfaquinoxaline to 1 part by weight of said diamino pyrimidine.

References Cited in the file of this patent

Falco et al.: British J. of Pharmacol. and Chemother., vol. 6, 1951, pp. 185–200 (particularly p. 188).

Seiden: Manufacturing Chemist, vol. 21, No. 4, April 1950, pp. 155 and 156.